United States Patent [19]

Sanders et al.

[11] Patent Number: 4,963,876
[45] Date of Patent: Oct. 16, 1990

[54] THIN PROGRAMMABLE REMOTE CONTROL TRANSMITTER

[76] Inventors: Rudy T. Sanders, 9520 Rhea Ave., Northridge, Calif. 91324; Lee Fleishman, 2169 Brookfield Dr., Thousand Oaks, Calif. 91362

[21] Appl. No.: 398,371
[22] Filed: Aug. 21, 1989
[51] Int. Cl.$^5$ ............................................. G08C 17/00
[52] U.S. Cl. ............................... 341/176; 340/825.69; 340/825.72; 361/392; 361/394; 455/90; 455/128
[58] Field of Search ................... 341/176; 455/128, 90; 361/392, 394; 200/5 A; 340/825.72, 825.69

[56] References Cited

U.S. PATENT DOCUMENTS

| | | | |
|---|---|---|---|
| 3,699,294 | 10/1972 | Sudduth | 200/5 A |
| 4,612,668 | 9/1986 | Sarac | 455/128 |
| 4,621,373 | 11/1986 | Hodsdon | 455/128 |
| 4,754,255 | 6/1988 | Sanders et al. | 341/176 |
| 4,806,930 | 2/1989 | Wojciak, Jr. | 340/825.69 |

Primary Examiner—Glen R. Swann, III
Attorney, Agent, or Firm—Sanford Astor

[57] ABSTRACT

A transmitter includes case, a thin non-conductive pad with an electrically conductive coating applied to selective areas of the pad, one or more electrically conductive actuator buttons on the pad to activate the transmitter, a thin insulator containing a plurality of separate areas which can easily be selectively punched out leaving open holes, and a printed circuit board containing the electronic circuits of the transmitter. Because all of the internal components can be manufactured as extremely thin elements, the transmitter can be made extremely small and thin.

19 Claims, 2 Drawing Sheets

४,९६३,८७६

THIN PROGRAMMABLE REMOTE CONTROL TRANSMITTER

BACKGROUND OF THE INVENTION

Remote control transmitters, particularly for the transmission of Radio Frequency (R F) signals, are commonly used for items such as garage door openers, vehicle security systems, television controllers, and other consumer appliances. As presently produced, these transmitters are somewhat bulky and large and cannot be comfortably carried in a pocket or purse. In many cases, this bulk is due to the means employed within the transmitter, such as dip switches, to select the encoded signal the transmitter broadcasts. An example of an R F transmitter of the type referred to is a transmitter described in our U.S. Pat. No. 4,754,255.

OBJECTS OF THE INVENTION

It is the principal object of the present invention to provide a transmitter which is extremely thin and small so that it can be comfortably carried in a person's pocket or purse and in addition, be connected to an item such as a key ring, providing the minimum difficulties to the user in carrying and using the transmitter.

A further object of the invention is to provide a transmitter for use in transmitting a predetermined signal (R F, infrared, ultrasonic, etc.) to a receiver for any particular purpose that is desired by the operator, such as a garage door opener or a vehicle security alarm system.

BRIEF DESCRIPTION OF THE DRAWINGS

These and other objects of the invention will be clear from a description of the invention and the enclosed drawings in which.

DESCRIPTION OF THE PREFERRED EMBODIMENT

Figure 1:
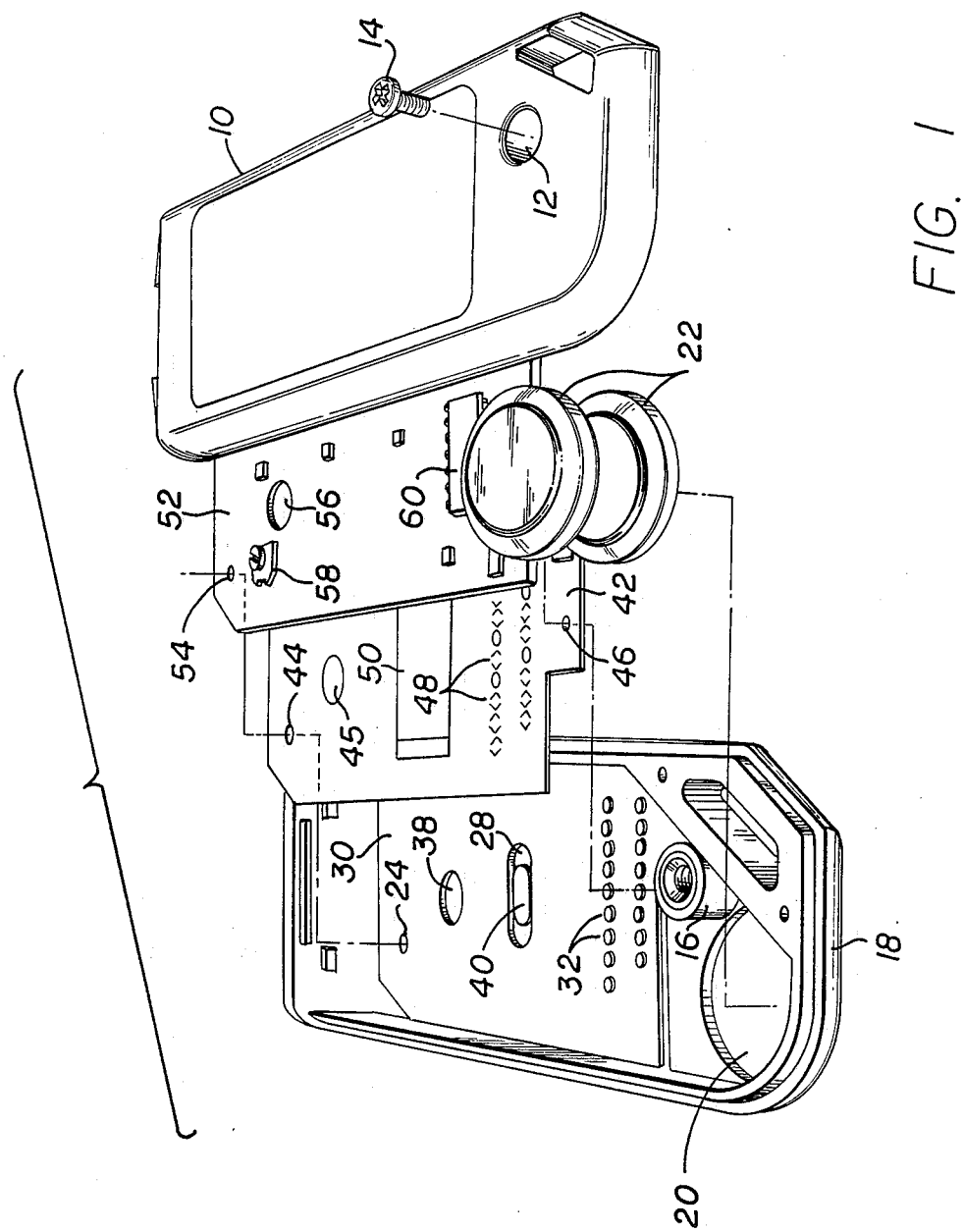
FIG. 1 is an exploded view of the transmitter of the present invention.

Referring now to the drawings, there is shown the bottom casing 10 of the transmitter housing with a hole 12 for insertion of a locking device such as a screw 14 which fits into a female receiver 16 contained in the top of the casing 18.

The top casing 18 has a receiving area 20 for the placement of a battery or batteries 22 which provide power to operate the device.

Alignment means such as one or more guideposts 24 are contained in the top casing 18 and provide means to align a first element 30, an insulator 42, and a printed circuit board 52, as they are assembled into the transmitter housing. A slot 28 is provided in the top casing 18 through which the user can press a button or buttons 40 which activate the transmitter.

Contained within the bottom casing 10 and the top casing 18 are the three elements as stated. In this description the first element 30 contains a plurality of rubber protrusions 32, plus one or more buttons 40 which, when depressed by the operator, activate the transmitter. The protrusions apply pressure to the PC board at area 62 (FIG. 2) when the transmitter is assembled. The buttons 40 and protrusions 32 have an electrically conductive coating thereon.

Instead of the first element 30 having protrusions, the first element 30 may be flat in the area where the protrusions 32 are located, having just the conductive coating and buttons 40, and instead, the top casing 18 may have the protrusions in the same alignment position, to apply pressure, when the transmitter is assembled, through the first element 30, at the surface area 32, to the PC board at area 62.

The first element 30 is a thin pad composed of silicon rubber or other flexible non-conductive material. The electrically conductive coating can be a conductive ink applied to the surface of or can be a conductive substance, such as carbon, impregnated into the protrusions or surface area 32 and the buttons 40. The use of an electrically conductive coating is well-known in the art.

Element 30 has holes 34 and 36 for alignment on guide posts 24 and a second guidepost hidden by receiver 16. A hole 38 is provided in the pad for the accommodation of an LED, if desired, which would give an indication that the transmitter is transmitting when the button(s) 40 are depressed.

A middle element comprising insulator 42 containing alignment holes 44 and 46 is placed over the first element 30 containing the conductive rubber protrusions 32. The insulator 42 contains a plurality of circular areas 48 which are designed to be easily and selectively punched out, either at the time of manufacture or later by the user, to create a specific pattern of holes through the insulator 42. While the areas are described as circular, they, of course, can be of any shape. Insulator 42 can be made of any convenient non-conductive material such as Mylar, paper, plastic, or any other non-conductive material. A slot 50 is also provided in insulator 42 so that button(s) 40 extending through both the transmitter casing 28 and the insulator 42 can activate the electronics contained on the PC board 52. Hole 45 is for an LED, if desired.

The third element 52 comprising the PC board is placed over the insulator 42. The PC board 52 has holes 54 and 55 for alignment on posts 24. Hole 56 is provided for the possible accommodation of an LED. PC board 52 comprises an optional adjustment component 58 which is a means to adjust the operating frequency upon which the encoded signal is broadcast, if desired.

Figure 2:
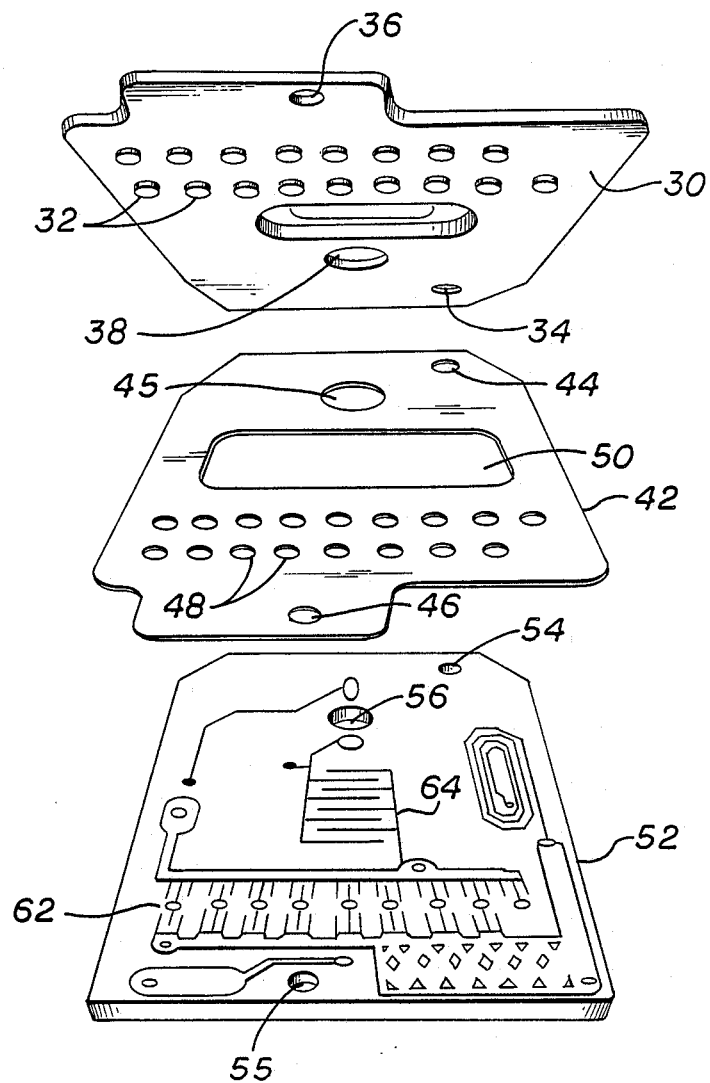
FIG. 2 is an exploded view of the internal elements of the transmitter.

As is shown more clearly in FIG. 2, PC board 52 on the side facing the insulator 42 has a series of contacts 62 which are adapted to come into continuous electrical contact with the conductive protrusions 32 only at those locations corresponding to those circular areas 48 that have been punched out of the insulator 42, leaving holes. Because the three elements 30, 42, and 52 are pressed together in the transmitter when they are assembled into the transmitter casing 10 and 18, the conductive protrusions 32 extend only through the holes which are created when one or more of the circular areas 48 are punched out. Those specific protrusions physically contact PC board 52 making electrical contact with contacts 62. By determining which pattern of circular areas 48 are punched out in insulator 42, the transmitter can be programmed to emit a uniquely encoded signal so that the transmitter may be personalized for the owner and user.

PC board 52 contains an integrated circuit area 60 which is adapted to generate a unique signal established by the pattern of circular area 48 punched out as described above. When button(s) 40 are depressed, electrical contact is established between a plurality of circuit traces 64 contained on PC board 52, activating the transmitter to broadcast the unique signal. Circuit traces 64 are comprised of a geometric pattern of conductive material which constitute the printed circuit on PC board 52.

The particular encoded signal, which is transmitted by the transmitter once it is programmed, assembled, and activated, is recognized only by a receiver programmed to receive and decode that uniquely encoded signal. The receiving of such a signal is well-known in the art as described in our U.S. Pat. No. 4,754,255.

The elements comprising the conductive area 32, with or without the rubber protrusions 32, and the PC board 52 may be made of any convenient material, such as plastic, etc. Because the casing and the elements can be made very small and very thin, the resulting transmitter can be made in a very sturdy manner and still be only approximately one-quarter of an inch thick and as small as approximately 2 inches in length and 1 inch in width. This provides an extremely easily carried transmitter for transmitting signals for a variety of uses as described, such as garage door openers and vehicle security alarm systems.

Having thus described the invention, it is requested that the scope of the invention be limited only by the scope of the appended claims.

We claim:

1. A programmable transmitter for the transmission of remote control signals comprising a first non-conductive element having a conductive area thereon, a second non-conductive element having a plurality of removable areas thereon, and a third element comprising a printed circuit board having a plurality of contacts thereon, said contacts adapted to come into continuous electrical contact with said first element's conductive area only at those locations where the removable areas are removed from said second element to program the transmitter.

2. The device of claim 1 in which the first element's conductive area comprises a plurality of conductive protrusions.

3. The device of claim 2 in which said conductive protrusions comprise rubber protrusions having an electrically conductive coating thereon.

4. The device of claim 2 in which said conductive protrusions comprise rubber protrusions having an electrically conductive material embedded therein.

5. The device of claim 1 in which said elements are encased in a housing.

6. The device of claim 5 in which said housing comprises protrusions adapted to apply continuous pressure against said first element's conductive area.

7. The device of claim 6 in which the means to generate power comprises a battery and the means to engage said battery comprises depressable button means.

8. The device of claim 5 further comprising means to align said elements.

9. The device of claim 1 further comprising means to generate a signal.

10. The device of claim 1 further comprising power means and means to engage said power means.

11. The device of claim 1 in which said conductive area comprises an electrically conductive coating affixed on said non-conductive element.

12. The device of claim 1 in which said conductive area comprises electrically conductive material embedded in said non-conductive element.

13. A programmable transmitter for the transmission of remote control signals comprising a housing having therein a first non-conductive element having a plurality of conductive protrusions affixed thereon, a second non-conductive element having a plurality of removable areas thereon, said areas matching the pattern of said protrusions, a third element comprising a printed circuit board having a plurality of electrical contacts thereon, said contacts adapted to come into continuous electrical contact with said protrusions only at those locations where the areas are removed from said second element, thereby creating a particular electrical pattern to program the transmitter, means to generate a signal, and means to power said signal generation means.

14. The device of claim 13 in which said signal generator means comprises an RF signal generator.

15. The device of claim 13 further comprising means to align said elements.

16. The device of claim 13 in which said conductive protrusions comprise rubber protrusions having an electrically conductive coating thereon.

17. The device of claim 13 in which said conductive protrusions comprise rubber protrusions having an electrically conductive material embedded therein.

18. The device of claim 13 in which the means to power comprises a battery.

19. The device of claim 18 comprising depressable button means adapted to engage said battery.

* * * * *